United States Patent
Hirth et al.

(10) Patent No.: US 9,300,427 B2
(45) Date of Patent: Mar. 29, 2016

(54) UPSTREAM SCHEDULING IN A PASSIVE OPTICAL NETWORK

(71) Applicant: Broadcom Corporation, Irvine, CA (US)

(72) Inventors: Ryan Edgar Hirth, Petaluma, CA (US); Glen Kramer, Windsor, CA (US)

(73) Assignee: Broadcom Corporation, Irvine, CA (US)

( * ) Notice: Subject to any disclaimer, the term of this patent is extended or adjusted under 35 U.S.C. 154(b) by 49 days.

(21) Appl. No.: 14/041,487

(22) Filed: Sep. 30, 2013

(65) Prior Publication Data

US 2015/0093108 A1   Apr. 2, 2015

(51) Int. Cl.
*H04J 14/00* (2006.01)
*H04J 14/08* (2006.01)
*H04J 14/02* (2006.01)
*H04Q 11/00* (2006.01)
*H04B 10/079* (2013.01)

(52) U.S. Cl.
CPC ......... *H04J 14/0223* (2013.01); *H04J 14/0238* (2013.01); *H04J 14/086* (2013.01); *H04Q 11/0067* (2013.01); *H04B 10/07955* (2013.01); *H04Q 2011/0064* (2013.01); *H04Q 2011/0083* (2013.01)

(58) Field of Classification Search
None
See application file for complete search history.

(56) References Cited

U.S. PATENT DOCUMENTS

| | | | | |
|---|---|---|---|---|
| 6,870,836 B1 * | 3/2005 | Dyke | ................. | H04J 14/0226 370/355 |
| 7,916,385 B2 * | 3/2011 | Piehler | ................. | H04B 10/673 359/337.1 |
| 8,320,760 B1 * | 11/2012 | Lam | ..................... | H04J 14/002 398/66 |
| 8,326,152 B2 * | 12/2012 | Van Veen | ......... | H04B 10/07955 398/160 |
| 8,837,946 B2 * | 9/2014 | Mun | ................ | H04B 10/25753 398/115 |
| 2006/0268759 A1 * | 11/2006 | Emery | ................. | H04B 10/077 370/321 |
| 2009/0190931 A1 * | 7/2009 | Hamano | ............ | H04J 14/0226 398/99 |
| 2009/0285581 A1 * | 11/2009 | Kim | ...................... | H04B 10/40 398/140 |
| 2010/0034534 A1 * | 2/2010 | Niibe | .................... | H04J 3/0682 398/25 |
| 2010/0239247 A1 * | 9/2010 | Kani | ................... | H04J 14/0227 398/41 |
| 2011/0200328 A1 * | 8/2011 | In De Betou | ......... | H04L 5/0003 398/38 |
| 2013/0004172 A1 * | 1/2013 | Sugawa et al. | .................. | 398/72 |
| 2013/0039656 A1 * | 2/2013 | Lam | .................... | H04J 14/0282 398/47 |
| 2014/0105602 A1 * | 4/2014 | Kawamura | .......... | H04L 12/4641 398/66 |

OTHER PUBLICATIONS

Kaminow et al., Optical Fiber Telecommunications: B: Systems and Networks V, 2008, Elsevier Inc., pp. 380-382.*
Zyskind et al., Optically Amplified WDM Networks, 2011, Elsevier Inc., p. 391.*
Dhaini et al., Dynamic Wavelength and Bandwidth Allocation in Hybrid TDM/WDM EPON Networks, 2007, IEEE, pp. 277-286.*

* cited by examiner

*Primary Examiner* — Ken Vanderpuye
*Assistant Examiner* — Jai Lee
(74) *Attorney, Agent, or Firm* — Sterne, Kessler, Goldstein & Fox P.L.L.C.

(57) ABSTRACT

In general, the 1G-EPON standard specifies its upstream waveband broadly to allow for low cost lasers to be used to transmit upstream. Often, however, the lasers actually used by many 1G-ONUs to transmit upstream only occupy a narrow waveband that does not overlap with the upstream waveband specified by the 10G-EPON standard. The present disclosure is directed to systems and methods that exploit this fact to efficiently provide for the coexistence of 10G-EPON and 1G-EPON over the same set of optical fibers in the upstream direction.

20 Claims, 7 Drawing Sheets

UPSTREAM SCHEDULING IN A PASSIVE OPTICAL NETWORK

TECHNICAL FIELD

This application relates generally to upstream scheduling in a passive optical network (PON).

BACKGROUND

The Institute of Electrical and Electronics Engineers (IEEE) has developed two standards for PONs that carry traffic as Ethernet frames. The first is the IEEE 802.3ah Ethernet PON (EPON) standard, commonly referred to as 1G-EPON. The second is the IEEE 802.3av standard, commonly referred to as 10G-EPON. In 1G-EPON, the data rate is one gigabit per second (Gb/s) in both the downstream and upstream direction. In 10G-EPON, the data rate is ten Gb/s in the downstream direction and either one or ten Gb/s in the upstream direction.

The 10G-EPON standard was specified to allow for the simultaneous operation of a 10G-EPON system with a 1G-EPON system over the same set of optical fibers. However, in the upstream direction, the wavebands used by these two systems overlap. Thus, to support coexistence of these two systems over the same set of optical fibers, their respective upstream transmissions are conventionally separated using a pure time-division multiple access (TDMA) scheme; wavelength-division multiple access (WDMA) is not used.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
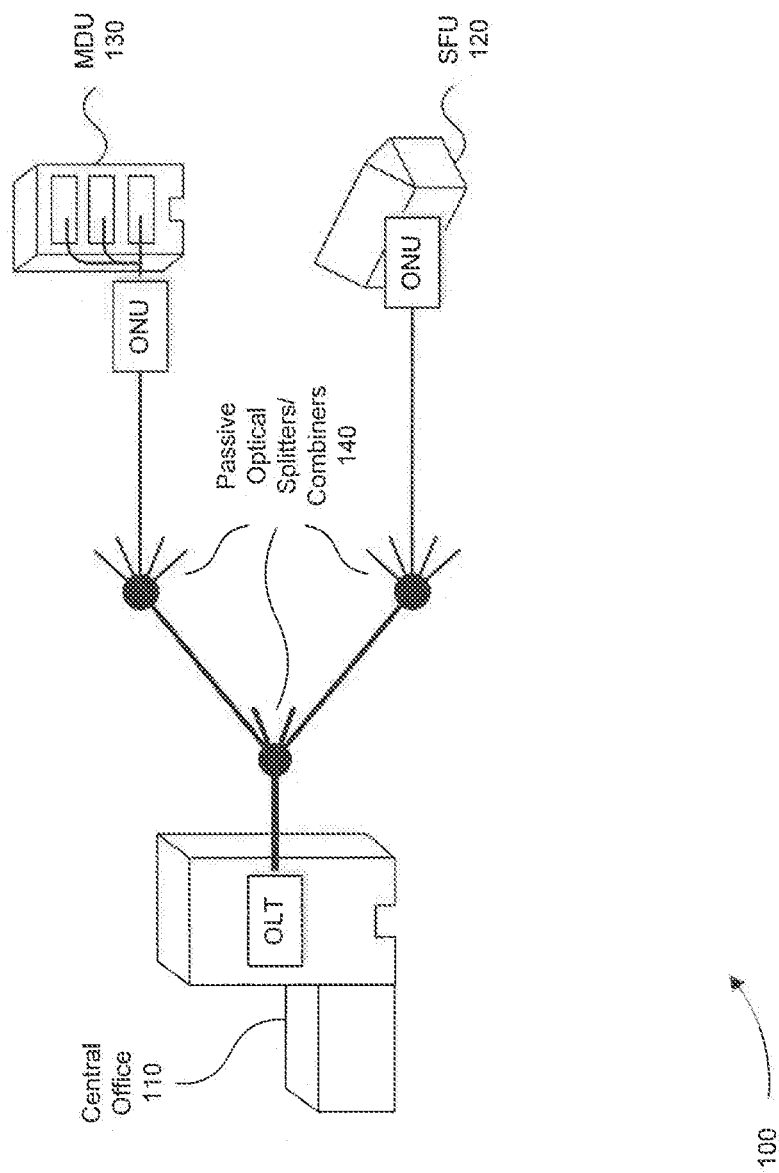
FIG. 1 illustrates an example PON in which embodiments of the present disclosure can be implemented.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming, a part of the module. Conversely, multiple modules described herein can represent a single component within an actual device. Further, components within a module can be in a single device or distributed among multiple devices in a wired or wireless manner.

I. OVERVIEW

In general, the 1G-EPON standard specifies its upstream waveband broadly to allow for low cost lasers to be used to transmit upstream. Often, however, the lasers actually used by many 1G-EPON optical network units (1G-ONUs) to transmit upstream only occupy a narrow waveband that does not overlap with the upstream waveband specified by the 10G-EPON standard.

The present disclosure is directed to systems and methods that exploit this fact to more efficiently provide for the coexistence of 10G-EPON and 1G-EPON in the upstream direction than the pure TDMA technique conventionally implemented. More specifically, the systems and methods of the present disclosure can determine which, if any, 1G-ONUs transmit upstream in wavebands that do not overlap with the upstream waveband specified by the 10G-EPON standard and schedule those 1G-ONUs to transmit upstream in a combined TDMA and WDMA manner with 10G-ONUs. The following sections describe these and other aspects of the present disclosure.

II. EXEMPLARY OPERATING ENVIRONMENT

FIG. 1 illustrates an exemplary PON 100 in which embodiments of the present disclosure can be implemented. As depicted in FIG. 1, PON 100 communicatively couples a central office 110 to a single family unit (SFU) 120 and a multi-dwelling unit (MDU) 130 (e.g., a structure housing two or more residential or business units). Transmissions within PON 100 are specifically performed between an OLT at central office 110 and ONUs at SFU 120 and MDU 130 over optical fibers that span the distance between them. The OLT at central office 110 couples PON 100 at its end to a service network (not shown), which can be a metropolitan area network or a core network, for example. In addition, the ONUs at SFU 120 and MDU 130 further couple PON 100 at their ends to home or business networks (also not shown).

The overall network structure shown in FIG. 1 allows end user devices coupled to the home or business networks within SFU 120 and MDU 130 to send data to, and receive data from, the service network over PON 100. Wavelength division multiplexing (WDM) can be used to send downstream traffic over one wavelength and upstream traffic over another wavelength.

It should be noted that PON 100 illustrates only one exemplary PON and fiber distribution topology (i.e., a tree topology) in which embodiments of the present disclosure can be implemented. Other fiber distribution topologies in which embodiments of the present disclosure can be implemented include other point-to-multipoint topologies, ring topologies, and mesh topologies, for example.

During operation of the access network illustrated in FIG. 1, signals sent downstream by the OLT at central office 110 are split by passive optical splitters/combiners 140 and are received by the ONUs at SFU 120 and MDU 130. The signals sent downstream are therefore broadcasted to all ONUs. Conversely, signals sent upstream by the ONUs at SFU 120 and MDU 130 are combined by passive optical splitters/combiners 140 and are received by the OLT at central office 110.

To prevent collisions in the upstream direction and to share the upstream capacity of PON 100 fairly, the OLT at central office 110 and the ONUs at SFU 120 and MDU 130 implement an arbitration mechanism. For example, many 1G-EPONs implement a non-contention based media access (MAC) scheme that grants each ONU access to the shared medium for a limited interval of time for transmitting data upstream in a time-division multiple access (TDMA) manner. This limited interval of time is commonly referred to as a time slot.

Figure 2:
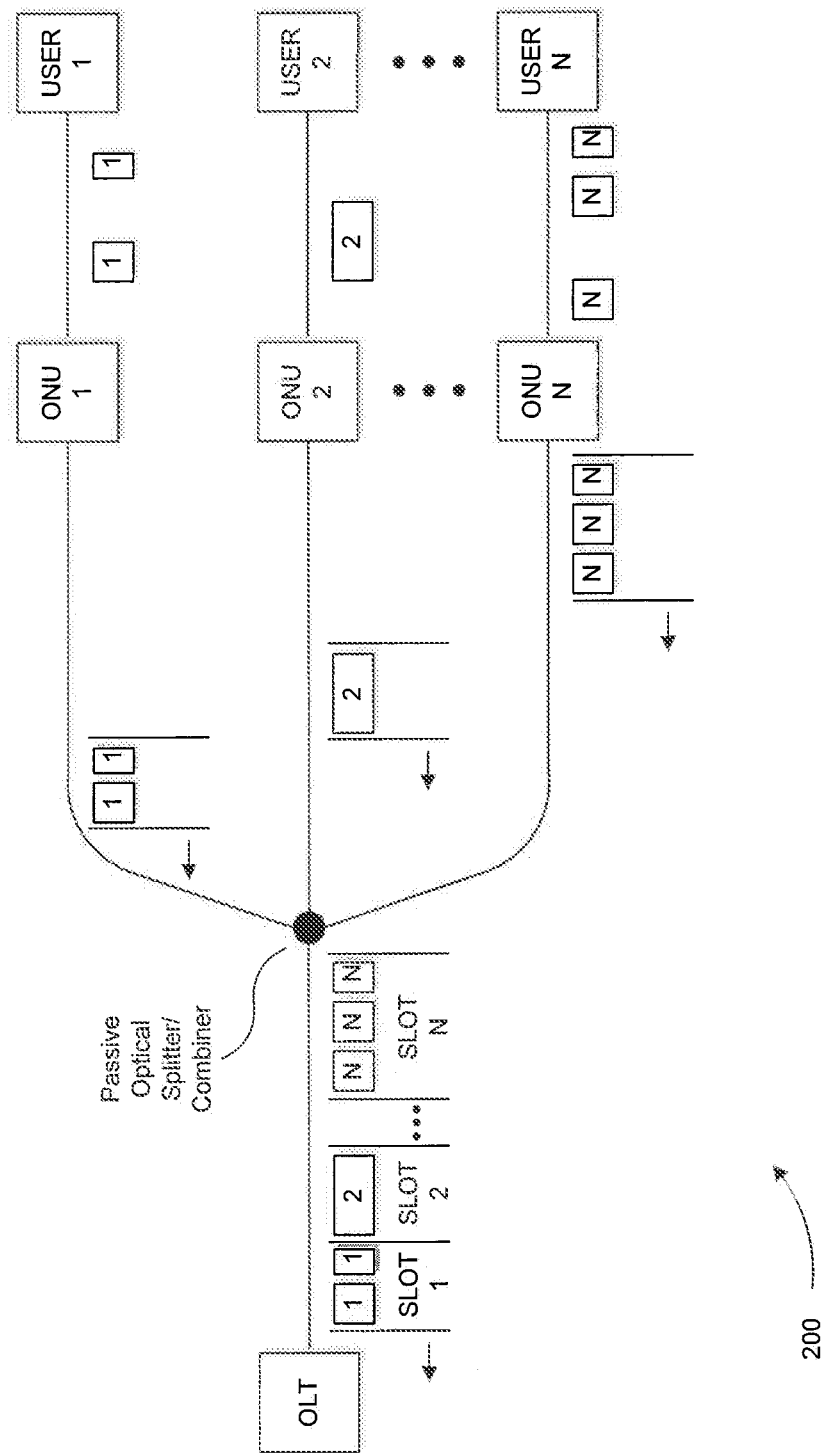
FIG. 2 illustrates an example of data being sent upstream over a PON.

FIG. 2 illustrates an example of data being sent upstream over a PON in accordance with such a non-contention based MAC scheme. In FIG. 2, each ONU 1 through N is allocated a timeslot for transmitting one or more packets of data upstream to the OLT. More specifically, each ONU 1 through N buffers packets received from an attached end user (or users) and bursts one or more of the buffered packets upstream to the OLT when its assigned timeslot arrives. For example, ONU 1 receives two packets of data from attached user 1, buffers the two packets of data, and bursts the two packets upstream during a first timeslot assigned to ONU 1. ONU 2 receives a single packet of data from attached user 2, buffers the packet of data, and bursts the single packet upstream during a second timeslot assigned to ONU 2. As can be seen from FIG. 2, the time slots are assigned to the ONUs such that they do not overlap in time, thereby preventing upstream collisions.

Beyond simply assigning time slots such that they do not overlap in time, the exact method of when and how much capacity is granted to a particular ONU in such a non-contention based media access scheme can greatly affect the performance of the PON. In most 1G-EPONs, for example, each ONU is dynamically assigned time slots of varying capacities based on the instantaneous amount of data buffered by the ONUs (e.g., in accordance with a dynamic bandwidth allocation (DBA) scheme).

In a 1G-EPON implementing a DBA scheme, the OLT is responsible for allocating upstream grants (or timeslots) to each ONU. An ONU defers its upstream transmissions until it receives a grant from the OLT. In order to receive a grant, an ONU generates and transmits an upstream message to the OLT called a REPORT message that informs the OLT of its respective upstream queue status. The OLT can use this information sent from one or more ONUs requesting upstream bandwidth to generate and transmit GATE messages to those ONUs. Each GATE message can generally allocate an upstream transmission grant to an ONU based on, for example, its upstream bandwidth needs and the upstream bandwidth needs of the other ONUs.

However, because ONUs are located at different, distances from the OLT, the signals sent upstream from each ONU will take different amounts of time, due to fiber delay, before reaching the OLT. Therefore, it is important to establish a common timing reference between the OLT and the ONUs to account for the different fiber delays so that, when an ONU signal arrives at the OLT, it arrives at or very near the moment the OLT intended to receive the signal. This prevents collisions in the upstream direction. The timing reference between the OLT and the ONUs can be established through a process called ranging, which is typically performed during a discovery process.

The discovery process is used by an OLT to detect and register ONUs that have been recently connected to the PON by learning their respective round-trip delays and MAC addresses. To perform the discovery process, the OLT periodically or intermittently transmits a discovery GATE message to the ONUs that includes a timestamp of the local time of the OLT and the start time of a discovery slot.

Un-registered ONUs can respond to the discovery GATE message by setting their local-time (as determined by their local clocks) to the timestamp included in the discovery GATE message. When the local clock of an un-registered ONU reaches the start time of the discovery slot (also included in the discovery GATE message), the ONU can transmit a REGISTER_REQUEST message. The REGISTER_REQUEST message can include the ONU's MAC address and a timestamp representing the ONU's local time when the REGISTER_REQUEST message was sent.

When the OLT receives the REGISTER_REQUEST message from the ONU, it can learn the MAC address of the ONU and the round-trip time (RTT) of the ONU. The RTT can be specifically calculated as the difference between the time the REGISTER_REQUEST message is received at the OLT and the timestamp included in the REGISTER_REQUEST message. The RTT time can be stored for each registered ONU and can be used to adjust the time that data frames from an ONU are to be transmitted (as instructed by the OLT). Because more than one un-registered ONU can respond during a discovery slot, collisions may occur. However, often no collision occurs.

Figure 3:
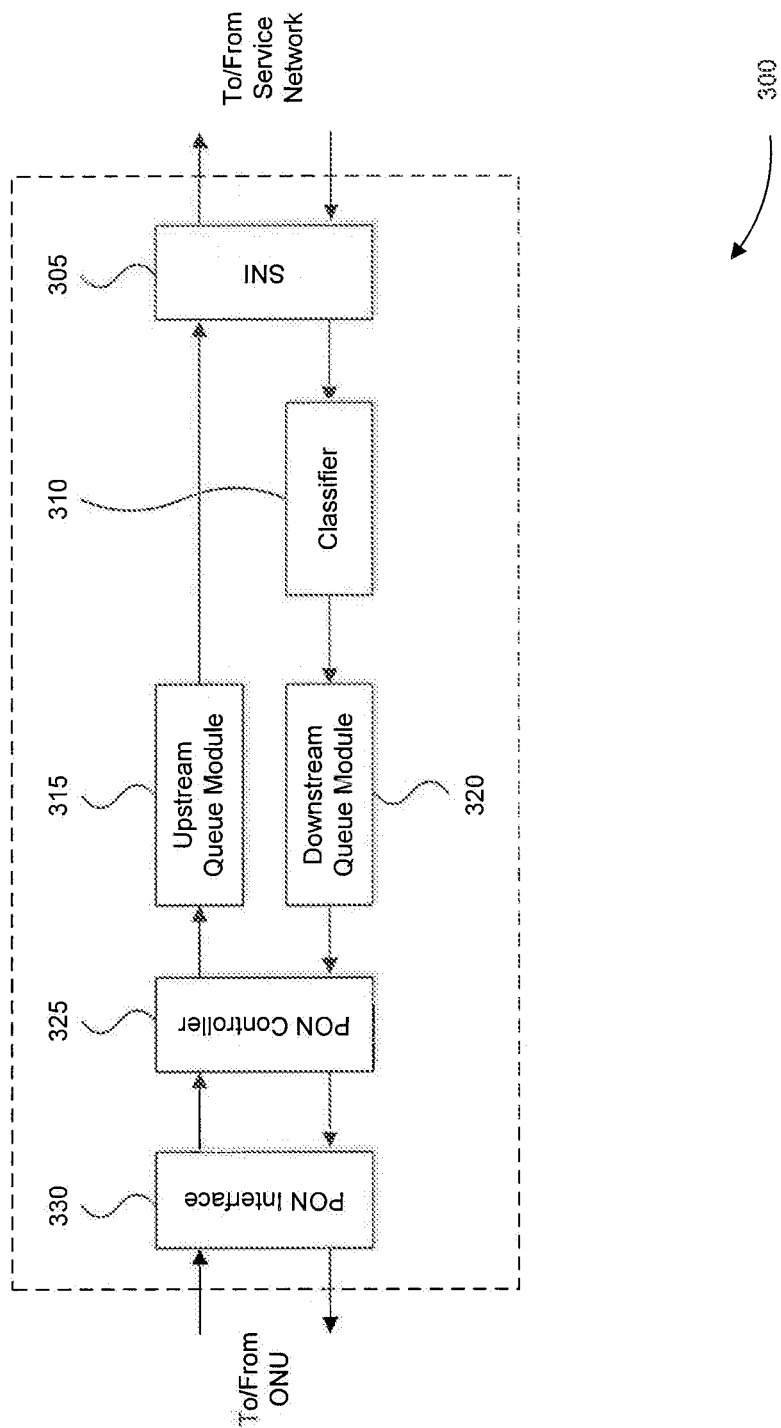
FIG. 3 illustrates an example block diagram of an optical line terminal (OLT).

Referring now to FIG. 3, an example block diagram of an OLT 300 is illustrated. OLT 300 includes a service network interface (SNI) 305, an optional classifier 310, an upstream queue module 315, a downstream queue module 320, a PON controller 325, and a PON interface 330.

In the upstream direction, PON interface 330 includes an optical transceiver (not shown) for receiving an optical signal transmitted from an ONU over a PON. Data in the form of packets are recovered from the optical signal and are provided to PON controller 325 in an electrical format. PON controller 325 accepts and analyzes the packets and, depending on the content of the packets, potentially passes them on to upstream queue module 315 for buffering. The packets buffered in upstream queue module 315 are subsequently transmitted to the service network via SNI 305.

In the downstream direction, packets of data to be transmitted to ONUs over the PON are initially received from the service network via SNI 305. Classifier 310 (optionally included in OLT 300) classifies the packets into a priority class based on the type of content the packets are carrying. For example, packets carrying voice or video data can be classified into a priority class characterized by small transmission delays (e.g., a high priority class), whereas packets carrying data other than voice or video can be classified into a priority class characterized by requiring only best effort transmission (e.g., a low priority class).

Assuming that classifier 310 is included in OLT 300, downstream queue module 320 can include a plurality of downstream queues, each with a designated priority level. Classifier 310 can insert a packet received from the service network via SNI 305 into one of the plurality of downstream queues with a designated priority corresponding to the packet's priority classification. Once removed from a downstream queue, the packets and generally sent downstream over the PON coupled to OLT 300 by PON controller 325 and PON interface 330.

As mentioned briefly above, the channel capacity of a PON is typically shared by multiple ONUs in the upstream direction. As a result, upstream transmissions from each ONU attached to the PON are arbitrated to avoid collisions. OLT 300 is configured to perform this arbitration by allocating grants (also called time slots) to the ONUs. In this scheme, an ONU defers upstream data transmissions until it receives a grant from OLT 300. In order to receive a grant, an ONU generates and transmits an upstream message to OLT 300 called a REPORT message that informs OLT 300 of the respective status of its upstream queues. OLT 300 can use this information sent from one or more of the ONUs requesting upstream bandwidth to generate and transmit GATE messages to those ONUs. Each GATE message generally allocates an upstream transmission grant to an ONU based on, for example, its upstream bandwidth needs and the upstream bandwidth needs of the other ONUs.

In OLT 300, PON controller 325 can be configured to process received REPORT messages and generate appropriate GATE messages in response. In addition, PON controller 325 can be further configured to perform the discovery process described above, which is used to detect and register ONUs that have been recently connected to the PON by learning, for example, their respective round-trip delays and MAC addresses.

III. 10G-EPON AND EFFICIENT UPSTREAM COEXISTENCE WITH 1G-EPON

To meet the demand for higher-speed data communications in fiber access networks, 10G-EPON was developed to provide communication speeds up to 10 times that of 1G-EPON. The 10G-EPON standard focuses primarily on the physical layer and leaves the basic MAC control protocol commonly used to schedule upstream transmissions in the 1G-EPON standard unchanged. This basic MAC control protocol for upstream transmissions was described above in Section II and involves ONUs informing the OLT of their upstream bandwidth requirements and the OLT scheduling and granting upstream bandwidth to the ONUs based on this information.

Figure 4:
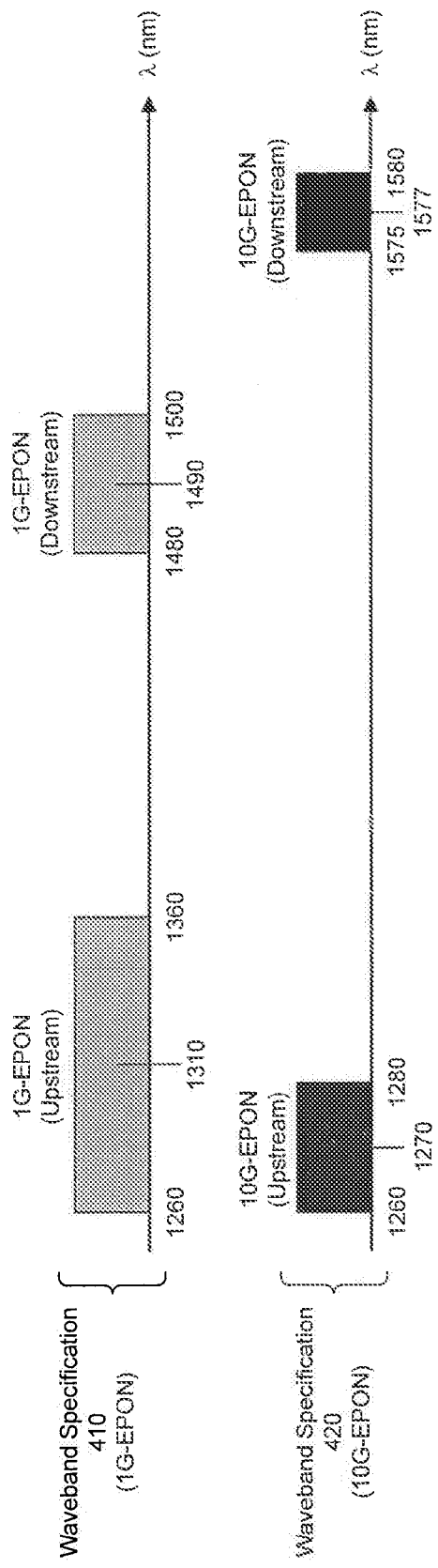
FIG. 4 illustrates the waveband specification for 1G-EPON in comparison with the waveband specification for 10G-EPON.

One area in which the standards for 10G-EPON and 1G-EPON differ at the physical layer includes the wavebands they specify for their respective upstream and downstream transmissions. FIG. 4 illustrates the waveband specification 410 for 1G-EPON in comparison with the waveband specification 420 for 10G-EPON. As can be seen, the 1G-EPON standard specifies a 100 nanometer (nm) waveband centered at 1310 nm for upstream transmission and a 20 nm waveband centered at 1490 nm for downstream transmission. The 10G-EPON standard, on the other hand, specifies a 20 nm waveband centered at 1270 nm for upstream transmission and a 5 nm waveband centered typically at 1577 nm for downstream transmission.

Because of this difference, and others at the physical layer, two techniques are conventionally used to achieve coexistence of 10G-EPON with 1G-EPON over the same set of fibers. First, in the downstream direction, a wavelength-division multiple access (WDMA) scheme is used to achieve coexistence because the downstream wavebands of 10G-EPON and 1G-EPON are distinct as shown in FIG. 4. In the upstream direction, however, such a straightforward approach is not possible. As further shown in FIG. 4, the upstream waveband of 10G-EPON is a subset of the upstream waveband of 1G-EPON. Thus, to achieve coexistence in the upstream direction, the conventional technique is to use a dual-speed TDMA scheme, with 10G-ONUS and 1G-ONUs taking turns in time to transmit upstream at their respective rates to an OLT equipped with a dual rate receiver.

In general, the 1G-EPON standard specifies its upstream waveband broadly to allow for low cost lasers to be used by 1G-ONUs to transmit upstream. Often, however, the lasers actually used by many 1G-ONUs to transmit upstream only occupy a narrow waveband that does not overlap with the upstream waveband specified by the 10G-EPON standard. For example, the upstream transmissions from a 1G-ONU may only occupy the waveband from 1300 nm-1320 nm, which does not overlap with the upstream waveband between 1260 nm-1280 nm used by the 10G-EPON standard. The present disclosure is directed to systems and methods that exploit this fact to more efficiently provide for the coexistence of 10G-EPON and 1G-EPON in the upstream direction than the conventional dual-speed TDMA technique. More specifically, the systems and methods of the present disclosure can determine which, if any, 1G-ONUs transmit upstream in wavebands that do not overlap with the upstream waveband specified by the 10G-EPON standard and schedule those 1G-ONUs to transmit upstream in a combined TDMA and WDMA manner with 10G-ONUs, while scheduling other 1G-ONUs in just a TDMA manner.

Figure 5:
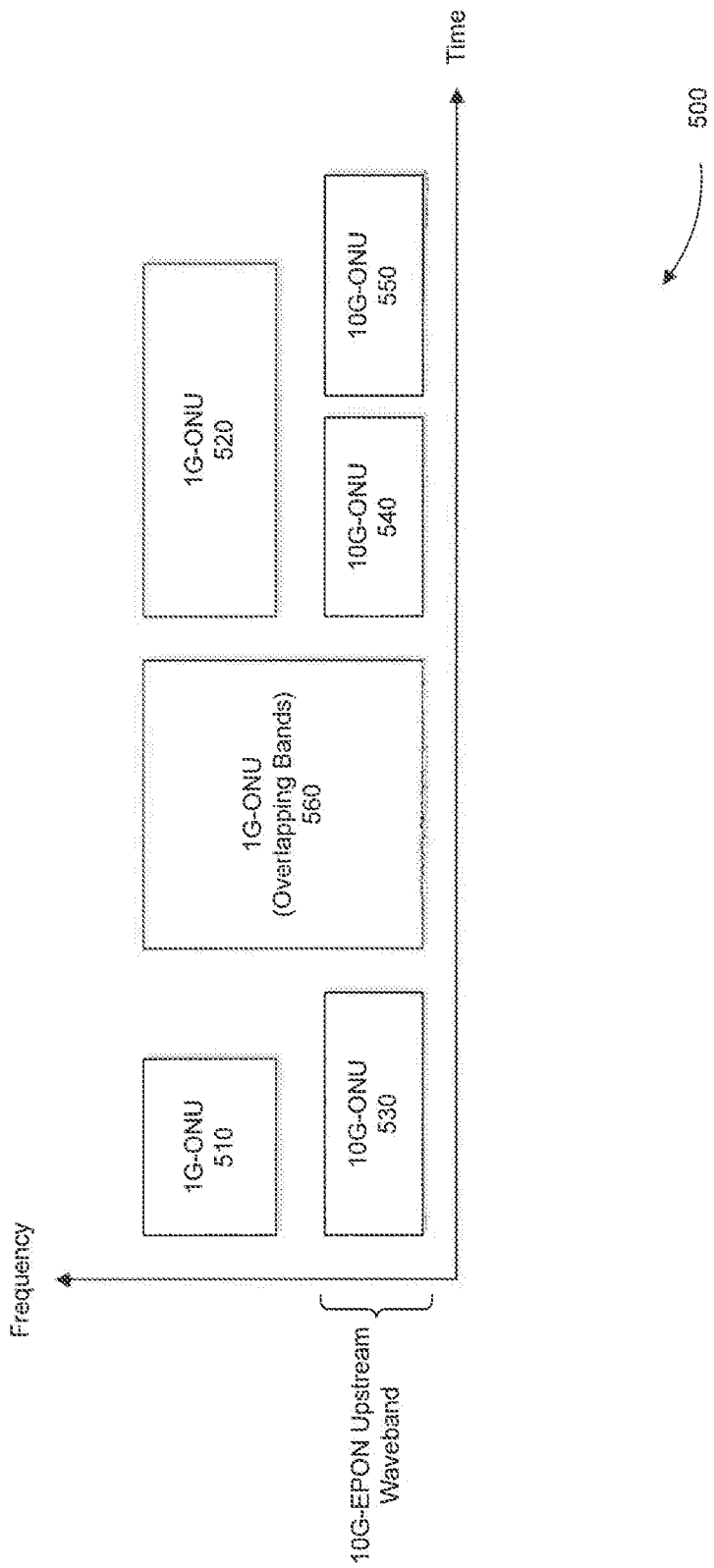
FIG. 5 illustrates example upstream transmissions from both 10G-ONUs and 1G-ONUs in accordance with embodiments of the present disclosure.

FIG. 5 illustrates example upstream transmissions from both 10G-ONUs and 1G-ONUs that were scheduled in accordance with the above described scheduling method. The upstream transmissions are plotted on a time versus frequency plot 500. As shown by plot 500, the upstream transmissions of 1G-ONUs 510 and 520 are transmitted over wavebands that do not overlap with the 10G-EPON upstream waveband and, as a result, were scheduled in a combined TDMA and WDMA manner with the upstream transmissions of 10G-ONUs 530, 540, and 550. For example, the upstream transmissions of 1G-ONU 510 and 10G-ONU 530 are transmitted at the same time, over the same set of fibers, in a WDMA manner. The upstream transmission of 1G-ONU 560, on the other hand, is transmitted in a waveband that overlaps with the 10G-EPON upstream waveband and as a result, is scheduled in just a TDMA manner with the upstream transmissions of 10G-ONUs 530, 540, and 550 to avoid interference.

Figure 6:
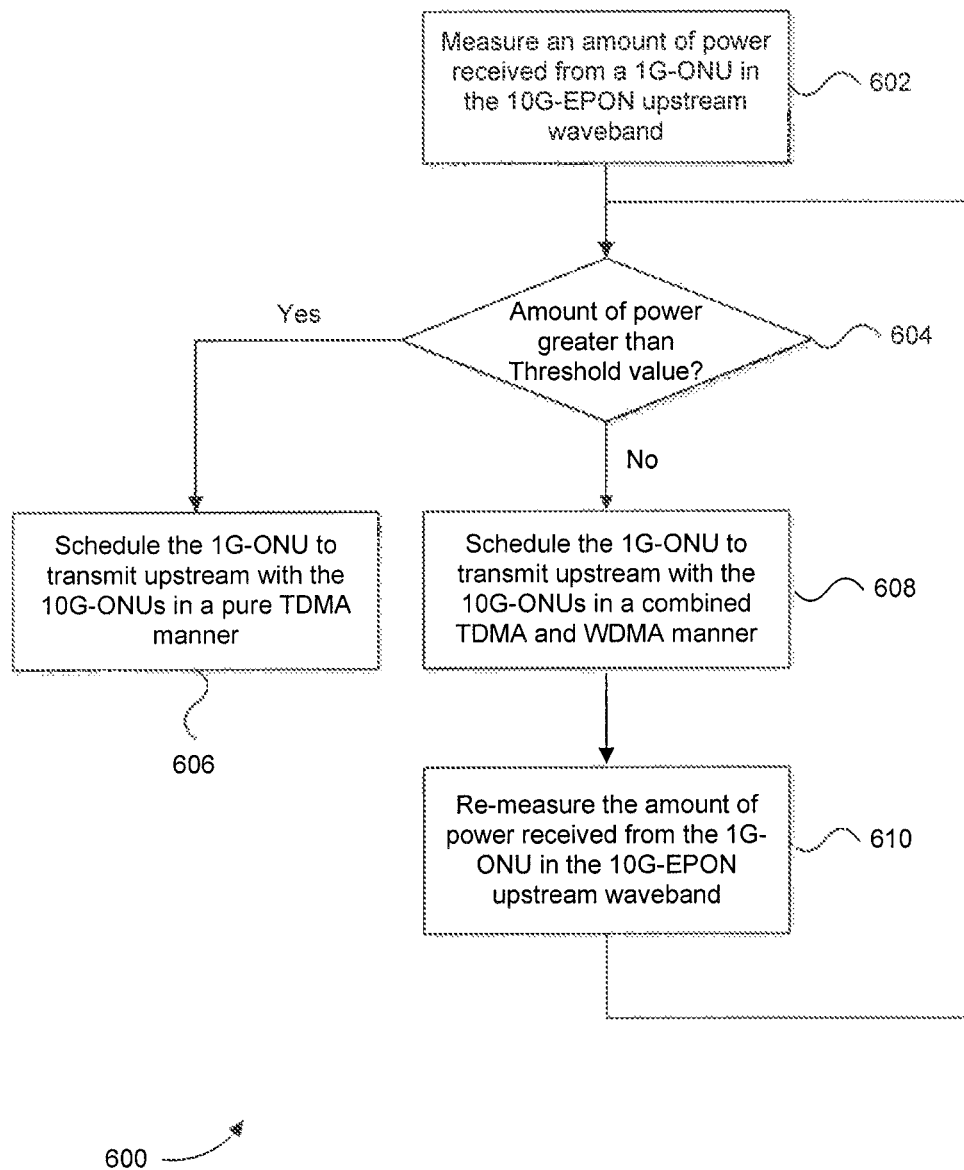
FIG. 6 illustrates a flowchart of a method for scheduling upstream transmissions from 1G-ONUs and 10G-ONUs in accordance with embodiments of the present disclosure.

Referring now to FIG. 6, a flowchart of an exemplary method 600 for scheduling upstream transmissions from 1G-ONUs and 10G-ONUs in the manner described above is illustrated in accordance with embodiments of the present disclosure. The method 600 can be implemented by an OLT, such as OLT 300 illustrated in FIG. 3 and, more specifically, by PON controller 325 of OLT 300.

As shown in FIG. 6, method 600 starts at step 602. At step 602, the amount of power received from a 1G-ONU in the 10G-EPON upstream waveband is measured. Step 602 can be performed by an OLT during, for example, the discovery process. As described above, the discovery process is used by an OLT to detect and register ONUs that have recently connected to the EPON. To perform the discovery process, the OLT periodically or intermittently transmits a discovery GATE message to which an un-registered ONU can respond. When the OLT receives such a response from a single unregister ONU, it can determine whether the un-registered ONU is a 1G-ONU or a 10G-ONU and, if the un-registered ONU is a 1G-ONU, it can then measure the amount of power received from the 1G-ONU in the 10G-EPON upstream waveband.

After step 602, method 600 proceeds to step 604 where the amount of power measured at step 602 is compared to a threshold value. If the amount of power measured at step 602 is greater than the threshold value, method 600 proceeds to step 606 and the 1G-ONU is permitted to be scheduled to transmit upstream with the 10G-ONUs in only a pure TDMA manner. On the other Land, if the amount of power measured at step 602 is less than the threshold value, method 600 proceeds to step 608 and the 1G-ONU is permitted to be scheduled to transmit upstream in a combined TDMA and WDMA manner with the 10G-ONUs. In a combined TDMA and WDMA manner, unlike a pure TDMA manner, an upstream transmission of the 1G-ONU can be schedule to overlap in time with an upstream transmission of a 10G-ONU. It should be noted that the threshold value can be set to any amount determined to provide sufficiently reliable upstream communications.

After step 608, method 600 can either end or optionally proceed to step 610. At optional step 610, the amount of power received from the 1G-ONU in the 10G-EPON upstream waveband is re-measured. Step 610 can be performed by an OLT during, for example, a time slot in which the 1G-ONU is the only device scheduled to transmit upstream. The OLT can schedule a dedicated time slot for this purpose. After re-measuring the amount of power received from the 1G-ONU in the 10G-EPON upstream waveband, method 600 can return to step 604. Step 610 can be performed to ensure that the amount of power received from the 1G-ONU in the 10G-EPON upstream waveband has not changed over time to a value above the threshold value specified in step 604. Such changes can occur due to temperature, for example.

As an alternative (or in addition) to optional step 610, optional step 610 could, be modified to monitor a number of bit errors (or the bit error rate) associated with upstream transmissions from the 1G-ONU or induced by the upstream transmissions from the 1G-ONU in the upstream transmissions of a 10G-ONU. Based on this number of bits errors, the 1G-ONU can continue to be scheduled to transmit upstream in a combined TDMA and WDMA manner with the 10G-ONUs or switched so that it is scheduled in only a pure TDMA manner with the 10G-ONUs. For example, if the number of bit errors is less than a threshold amount, the 1G-ONU can continue to be scheduled to transmit upstream in a combined TDMA and WDMA manlier with the 10G-ONUs.

It should be noted that PON interface 330, shown in FIG. 3, can be configured to split an upstream signal received over a PON to detect the amount of power received from a 1G-ONU in the 10G-EPON upstream waveband. PON interface 330 can include, for example, a splitter to split an upstream signal received over a PON and a filter with a pass band substantially equal to the 10G-EPON upstream waveband to filter the split signal. PON interface 330 can then measure the amount of power of the filtered signal. PON interface 330 can split and filter the upstream signal in either the optical or electrical domain.

IV. EXAMPLE COMPUTER SYSTEM ENVIRONMENT

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
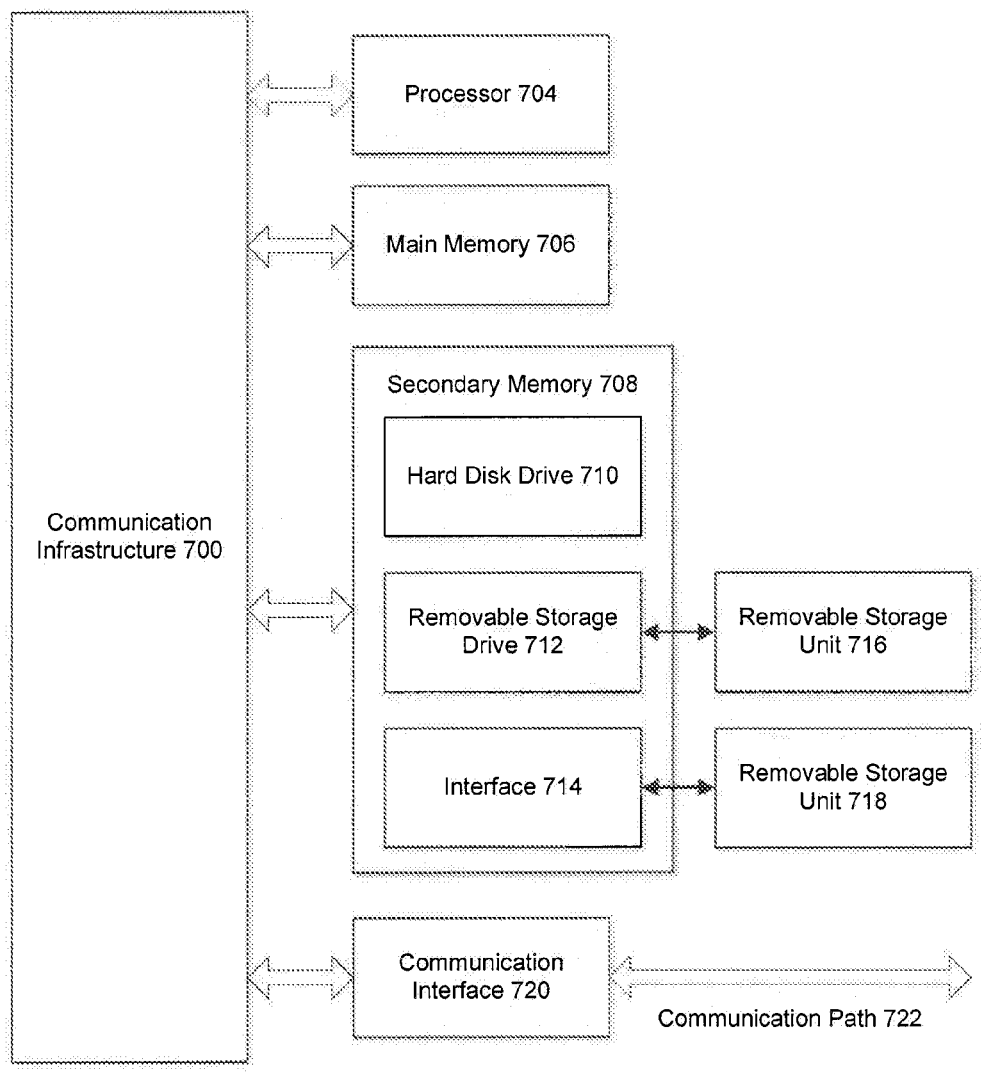
FIG. 7 illustrates an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. Modules depicted in FIG. 3 may execute on one or more computer systems 700. Furthermore, each of the steps of the method depicted in FIG. 6 can be implemented on one or more computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

V. CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method comprising:
measuring an amount of power received from a first optical network unit (ONU) in a waveband used by a second ONU to transmit upstream over a passive optical network (PON); and
based on the detected amount of power received from the first ONU in the waveband, selecting between a pure time-division multiple access manner and a combined time-division and wavelength-division multiple access manner to schedule upstream transmissions of the first ONU with upstream transmissions of the second ONU over the PON.

2. The method of claim 1, wherein the waveband spans from 1260 nm-1280 nm.

3. The method of claim 1, wherein measuring the amount of power received from the first ONU in the waveband used by the second ONU to transmit upstream is performed during a discovery slot.

4. The method of claim 1, wherein the selecting further comprises:
selecting the pure time-division multiple access manner to schedule the upstream transmissions of the first ONU with the upstream transmissions of the second ONU over the PON if the detected amount of power received from the first ONU in the waveband is greater than a threshold amount.

5. The method of claim 1, wherein the selecting further comprises:
selecting the combined time-division and wavelength-division multiple access manner to schedule the upstream transmissions of the first ONU with the upstream transmissions of the second ONU over the PON if the detected amount of power received from the first ONU in the waveband is less than a threshold amount.

6. The method of claim 5, further comprising:
re-measuring the amount of power received from the first ONU in the waveband used by the second ONU to transmit upstream; and
based on the redetected amount of power received from the first ONU in the waveband used by the second ONU to transmit upstream, selecting between the pure time-division multiple access manner and the combined time-division and wavelength-division multiple access manner to schedule the upstream transmissions of the first ONU with the upstream transmissions of the second ONU over the PON.

7. The method of claim 6, wherein re-measuring the amount of power received from the first ONU in the waveband used by the second ONU to transmit upstream is performed during a time slot in which the first ONU is the only device scheduled to transmit upstream.

8. The method of claim 5, further comprising:
monitoring a number of bit errors associated with the upstream transmissions from the first ONU or induced by the upstream transmissions from the first ONU; and
based on the number of bits errors associated with upstream transmissions from the first ONU or induced by the upstream transmissions from the first ONU, selecting between the pure time-division multiple access manner and the combined time-division and wavelength-division multiple access manner to schedule the first ONU to transmit upstream with the second ONU or another ONU.

9. A method comprising:
measuring an amount of power received from a 1G optical network unit (1G-ONU) in a waveband used by 10G optical network units (10G-ONUs) to transmit upstream over a passive optical network (PON); and based on the detected amount of power received from the 1G-ONU in the waveband, selecting between a pure time-division multiple access manner and a combined time-division and wave-length division multiple access manner to schedule upstream transmissions of the 1G ONU with upstream transmissions of the 10G ONUS over the PON.

10. The method of claim 9, wherein the waveband spans from 1260 nm-1280 nm.

11. The method of claim 9, wherein measuring the amount of power received from the 1G-ONU in the waveband used by the 10G-ONUs to transmit upstream is performed during a discovery slot.

12. The method of claim 9, wherein the selecting further comprises:

selecting the pure time-division multiple access manner to schedule the upstream transmissions of the 1G ONU with the upstream transmissions of the 10G ONUs over the PON if the detected amount of power received from the 1G-ONU in the waveband is greater than a threshold amount.

13. The method of claim 9, wherein the selecting further comprises:

selecting the combined time-division and wavelength-division multiple access manner to schedule the upstream transmissions of the 1G ONU with the upstream transmissions of the 10G ONUs over the PON if the detected amount of power received from the 1G-ONU in the waveband is less than a threshold amount.

14. The method of claim 13, further comprising:

re-measuring the amount of power received from the 1G-ONU in the waveband used by the 10G-ONUs to transmit upstream; and based on the redetected amount of power received from the 1G-ONU in the waveband used by the 10G-ONUs to transmit upstream, selecting between the pure time-division multiple access manner and the combined time-division wavelength-division multiple access manner to schedule the upstream transmissions of the 1G ONU with the upstream transmissions of the 100 ONU over the PON.

15. The method of claim 14, wherein re-measuring the amount of power received from the 1G-ONU in the waveband used by the 10G-ONUs to transmit upstream is performed during a time slot in which the 1G-ONU is the only device scheduled to transmit upstream.

16. The method of claim 13, further comprising:

monitoring a number of bit errors associated with the upstream transmissions from the 1G-ONU or induced by the upstream transmissions from the 1G-ONU; and based on the number of bits errors associated with upstream transmissions from the 1G-ONU or induced by the upstream transmissions from the 1G-ONU, selecting between the pure time-division multiple access manner and the combined time-division wavelength-division multiple access manner to schedule the 1G ONU to transmit upstream with the 10G ONUs.

17. An optical line terminal (OLT) comprising:

a passive optical network (PON) interface configured to detect an amount of power received from a first optical network unit (ONU) in a waveband used by a second ONU to transmit upstream over a PON; and a PON controller configured to select between a time-division multiple access manner and a wavelength-division multiple access manner to schedule upstream transmissions of the first ONU with upstream transmissions of the second ONU over the PON based on the detected amount of power received from the first ONU in the waveband.

18. The OLT of claim 17, wherein the waveband spans from 1260 nm-1280 nm.

19. The our of claim 17, wherein detecting the amount of power received from the first ONU in the waveband used by the second ONU to transmit upstream is performed during a discovery slot.

20. The OLT of claim 17, wherein the PON controller is further configured to select the pure time-division multiple access manner to schedule the upstream transmissions of the first ONU with the upstream transmissions of the second ONU over the PON if the detected amount of power received from the first ONU in the waveband is greater than a threshold amount.

* * * * *

UNITED STATES PATENT AND TRADEMARK OFFICE
CERTIFICATE OF CORRECTION

PATENT NO. : 9,300,427 B2
APPLICATION NO. : 14/041487
DATED : March 29, 2016
INVENTOR(S) : Hirth et al.

Page 1 of 1

It is certified that error appears in the above-identified patent and that said Letters Patent is hereby corrected as shown below:

Claims

In column 11, line 42, claim 14 please replace "100 ONU" with --10G ONU--.

In column 12, line 31, claim 19 please replace "The our" with --The OTL--.

Signed and Sealed this
Fourteenth Day of June, 2016

Michelle K. Lee
*Director of the United States Patent and Trademark Office*